UNITED STATES PATENT OFFICE.

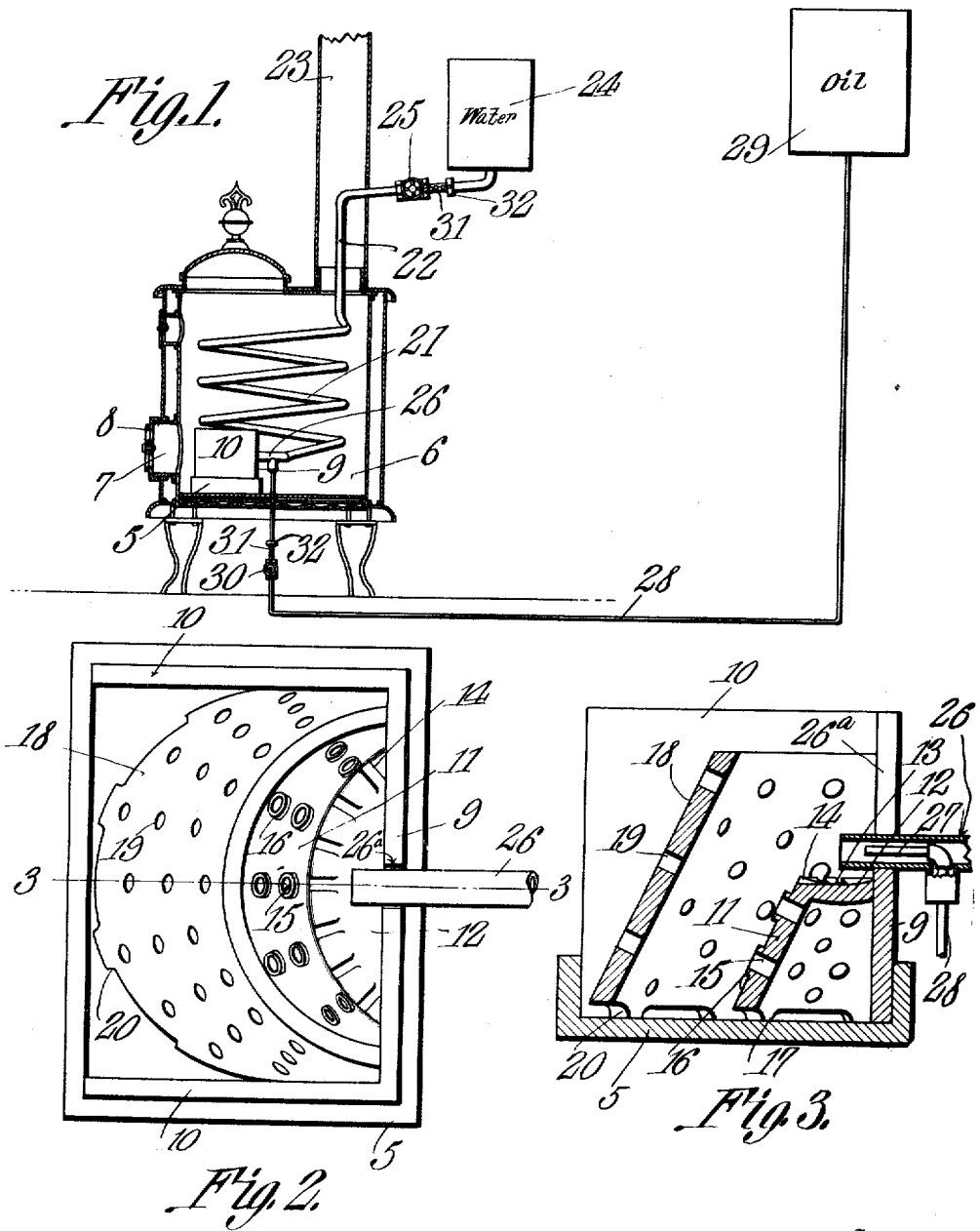

WILLIAM A. TUCKER, OF AUSTIN, TEXAS.

LIQUID-FUEL BURNER.

1,343,945.

Specification of Letters Patent.   Patented June 22, 1920.

Application filed December 31, 1919.   Serial No. 348,661.

*To all whom it may concern:*

Be it known that I, WILLIAM A. TUCKER, a citizen of the United States, residing at Austin, in the county of Travis and State of Texas, have invented a new and useful Liquid-Fuel Burner, of which the following is a specification.

This invention relates to liquid fuel burners designed for application to domestic cooking and heating stoves, and it has for its object to provide in a burner of this kind an improved device for vaporizing the fuel, and also to provide a burner in which the parts are made separable so that they can be readily placed in position within the fire pot of the stove, to convert the same into an oil burning stove, and which parts can also be readily moved from the stove if it is desired to use the regular fuel for which the stove is designed.

Another object of the invention is to provide a burner which gives a large hot fire, the oil being spread over a large surface, and also to provide for an abundant supply of air to the fire.

The invention also has for its object to provide a burner of the kind stated embodying certain novel and improved structural details to be hereinafter described and claimed.

In the accompanying drawing forming a part of this specification,

Figure 1 is a vertical section of a stove showing the burner in position therein.

Fig. 2 is an enlarged plan view of the burner.

Fig. 3 is a cross section on the line 3—3 of Fig. 2.

In the drawing, 5 denotes a shallow pan or tray in which the several parts constituting the burner, are mounted. This pan is mounted in the fire box 6 of the stove, adjacent to the draft opening 7. Fig. 1 of the drawing shows an ordinary wood burning heating stove. The opening 7 has a damper 8 for controlling the flow of air into the fire box. The pan is rectangular in contour, although this is immaterial, and some other shape may be adopted, the shape depending on the kind of stove to which the burner is to be applied.

In the pan is mounted a heat retaining member comprising a rear wall 9, and end walls 10, these walls rising from the pan to a suitable height from the rear and end portions thereof, leaving the front portion of the pan open, and as said open portion is directly in line with the air opening 7, the air has an unobstructed passage to the burner.

Inclosed by the walls 10, are two vapor generating devices. One of these devices is an inclined plate 11 extending outwardly in a curve from the wall 9. At the top of the plate 11 is a shelf 12 extending to the wall 9, and closing the space between said wall and the plate 11. The shelf is formed with a depression 13 from which conduits 14 lead to the outer surface of the plate 11, so that the oil may flow from the depression, to said outer surface of the plate, and runs down the same. In the plate 11 are air openings 15, and the outer ends of these openings are surrounded by outstanding flanges 16, these flanges being provided to prevent the oil which is running down the outer surface of the plate from entering the openings. The plate 11 is spaced a short distance from the bottom of the pan by legs 17, the latter also forming air spaces opening into the space between the plate and the wall 9.

The other vapor generating device is an inclined plate 18 mounted in the pan, and extending in a curve around the plate 11, and having air openings 19. The plate 18 rises to a greater height than the plate 11, and is also located within the walls 9 and 10, and spaced from the plate 11. The plate 18 is also spaced from the bottom of the pan by legs 20 forming air spaces which open into the space between said plate and the plate 11.

In the fire box of the stove is mounted a coil 21 connected at one end to a pipe 22 extending into the smoke pipe 23 of the stove, and out of the same to a tank or reservoir 24 containing a supply of water. On the outside of the smoke pipe 23, the pipe 22 is provided with a valve 25 for controlling the flow of water to the coil.

To the other end of the coil is connected a pipe 26 passing through a notch 26ᵃ in the wall 9 and having its end located above the shelf 12, so as to discharge thereonto.

In the outlet end of the pipe 26 is mounted an oil discharging nozzle 27 connected to a pipe 28 entering said pipe 26. The pipe 28 enters the fire box of the stove through the bottom thereof, or any other convenient portion of the stove, and leads to a tank 29 containing a supply of oil, the tank being suitably elevated so that the oil may flow to the burner by gravity.

The nozzle 27 is spaced from the inner surface of the pipe 26, and its outlet end is spaced a short distance from the outlet end of said pipe.

In the pipe 28, on the outside of the stove, is a valve 30 for controlling the amount of oil flowing to the burner. To the handle of this valve, as well as the valve 25, are connected chains 31 carried by collars 32 adjustably mounted on the respective pipes in which the valves are interposed, these chains being provided for the purpose of locking the valves to prevent children and inexperienced persons from operating the same.

In operation, a small amount of oil is allowed to run into the depression in the shelf 12, in which it is ignited. The flame from the burning oil quickly heats the plates 11 and 18, so that when the oil is turned on again, and drops on the shelf, it will be at once vaporized as it runs down the outer surface of the plate 11, it being led thereto by the conduits 14. The water in the coil 21 will also be heated, and steam is generated, which issues from the pipe 26, and as it flows past the mouth of the nozzle 27, it produces an atomizing action, the oil issuing from the nozzle in the form of a fine spray which is mixed with the steam, and is discharged from the pipe 26 in the direction of the plate 18. This spray is thrown against the inner surface of the plate 18, and spreads over the same, and also drops on the plate 11, and as these plates are intensely hot, the mixture is at once vaporized, and burned. The bottom openings of the plates furnish an abundant supply of air to support combustion, the air being readily controlled by the damper 8. Air also passes through all parts of the burning mass by the way of the openings 15 and 19, and combustion is complete. The pipe 26 protects the nozzle 27 from the intense heat. The opening in the pipe 26 through which the oil pipe extends, will be made large enough to admit air also into said pipe 26, which air is mixed with the oil and steam, and increases the combustibility of the mixture.

The several parts herein described constituting the burner are separable so that they can be readily assembled and placed in the stove, and if a fuel other than oil is to be used in the stove, the burner may be removed. The preferred embodiment of the invention has been shown and described, but it will be understood that various changes in the size, shape and other structural details to adapt the burner to different kinds of stoves, may be resorted to, without a departure from the invention.

What is claimed is:

1. A liquid fuel burner comprising a pan, a wall rising from one side of the pan, a perforated and inclined plate rising from the bottom of the pan, and extending outwardly from the wall in a curve, and formed at its upper end with a shelf extending to said wall, a fuel pipe having its outlet end located above the shelf, and a perforated plate rising from the pan, and surrounding the first mentioned plate in spaced relation therewith.

2. A liquid fuel burner comprising a pan, a wall rising from one side of the pan, a perforated and inclined plate rising from the bottom of the pan, and extending outwardly from the wall in a curve, and formed at its upper end with a shelf extending to said wall, the outer surface of the plate having outstanding flanges surrounding the perforations, a fuel pipe having its outlet end located above the shelf, and a perforated plate rising from the pan and surrounding the first mentioned plate in spaced relation therewith.

3. A liquid fuel burner comprising a pan, a wall rising from one side of the pan, a perforated and inclined plate rising from the bottom of the pan, and extending outwardly from the wall in a curve, and formed at its upper end with a shelf extending to said wall, said shelf having a depression, and conduits leading from the same to the outer surface of the plate, a fuel pipe having its outlet end located above the shelf, and a perforated plate rising from the pan and surrounding the first mentioned plate in spaced relation therewith.

4. A liquid fuel burner comprising a pan, a wall rising from one side of the pan, a perforated and inclined plate rising from the bottom of the pan, and extending outwardly from the wall in a curve, and formed at its upper end with a shelf extending to said wall, said plate being supported on legs, whereby it is spaced from the pan bottom, and openings are had into the space between the plate and the wall, a fuel pipe having its outlet end located above the shelf, and a perforated plate rising from the pan and surrounding the first mentioned plate in spaced relation therewith.

5. A liquid fuel burner comprising a pan, a wall rising from one side of the pan, a perforated and inclined plate rising from the bottom of the pan, and extending outwardly from the wall in a curve, and formed at its upper end with a shelf extending to the said wall, a fuel pipe having its outlet end located above the shelf, and a perforated plate rising from the pan and surrounding the first mentioned plate in spaced relation therewith, both of the aforesaid plates having legs whereby they are spaced from the pan bottom, and air openings are had into the spaces between the plates, and between the first mentioned plate and the aforesaid wall.

In testimony that I claim the foregoing as my own, I have hereto affixed my signature in the presence of two witnesses.

WILLIAM A. TUCKER.

Witnesses:
S. D. HEFFINGTON,
EMILIE LIMBERG.